United States Patent
Super et al.

(10) Patent No.: US 9,706,105 B2
(45) Date of Patent: Jul. 11, 2017

(54) APPARATUS AND METHOD FOR SPECIFYING AND AIMING CAMERAS AT SHELVES

(71) Applicant: SYMBOL TECHNOLOGIES, INC., Schaumburg, IL (US)

(72) Inventors: Boaz J Super, Oak Park, IL (US); Ankur R Patel, Palatine, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 320 days.

(21) Appl. No.: 14/518,091

(22) Filed: Oct. 20, 2014

(65) Prior Publication Data

US 2016/0112628 A1    Apr. 21, 2016

(51) Int. Cl.
    *H04N 7/18*      (2006.01)
    *G06K 9/46*      (2006.01)
    *H04N 5/232*     (2006.01)
    *G06Q 10/08*     (2012.01)

(52) U.S. Cl.
    CPC ......... *H04N 5/23216* (2013.01); *G06Q 10/08* (2013.01)

(58) Field of Classification Search
    CPC ........... H04N 5/23216; H04N 5/23245; G06K 9/00201
    See application file for complete search history.

(56) References Cited

U.S. PATENT DOCUMENTS

| | | | |
|---|---|---|---|
| 7,839,431 B2 | 11/2010 | Swarr et al. | |
| 7,845,560 B2 | 12/2010 | Emanuel et al. | |
| 8,091,782 B2 | 1/2012 | Cato et al. | |
| 8,423,431 B1 | 4/2013 | Rouaix et al. | |
| 8,520,067 B2 | 8/2013 | Ersue | |
| 9,367,831 B1* | 6/2016 | Besehanic | G06Q 10/087 |
| 2013/0235165 A1 | 9/2013 | Gharib et al. | |
| 2013/0278631 A1 | 10/2013 | Border et al. | |
| 2015/0029339 A1* | 1/2015 | Kobres | G06Q 30/00 348/150 |
| 2015/0363758 A1* | 12/2015 | Wu | G06Q 20/201 705/20 |
| 2016/0092943 A1* | 3/2016 | Vigier | G06Q 30/0281 705/346 |

FOREIGN PATENT DOCUMENTS

JP    GB 2323238 A * 9/1998 ......... H04N 5/23209

* cited by examiner

*Primary Examiner* — Tsion B Owens

(57) ABSTRACT

An apparatus including a display screen displaying input fields for accepting user-input a list of input parameters that includes a height of the camera, a distance from the camera to the shelf, at least one of a width-span and a height-span. The apparatus also includes a memory to store a required minimum pixel-resolution of a selected label and to store a list of camera types, and includes a microprocessor configured to determine at least an elevation angle from the list of input parameters. The display screen can also be configured for displaying at least one camera type selected from the list of camera types based a selection criterion that depends upon at least some of said output parameters.

17 Claims, 6 Drawing Sheets

APPARATUS AND METHOD FOR SPECIFYING AND AIMING CAMERAS AT SHELVES

BACKGROUND OF THE INVENTION

In retail stores, the retailer, the manufacturers, and customers often want to have reliable information about the products on the shelf. For apparel and high-priced items, RFID tags can be attached to these products, and RFID readers can be used to read these RFID tags to provide the needed information. For fast-moving, low-cost consumer packaged goods such as those found in supermarkets, drug stores, and convenience stores, product information can be provided using image-based product recognition system.

For creating shelf-level business intelligence based on visual recognition of products on shelves, cameras need to be installed in retailer premises for visual product analytics (VPA). In general, these cameras need to be aimed at, and usefully frame, the products on the shelves in order to support product recognition effectively and efficiently. In addition, the number of pixels per imaged product label must be high enough to support the product recognition algorithms. Furthermore, because shelf heights, camera mounting heights, and aisle widths vary from store to store and from location to location within a store, there is a need to have a design and installation tool for generating specifications of cameras and their positioning for successful sourcing, selection and installation of cameras for visual product analysis.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
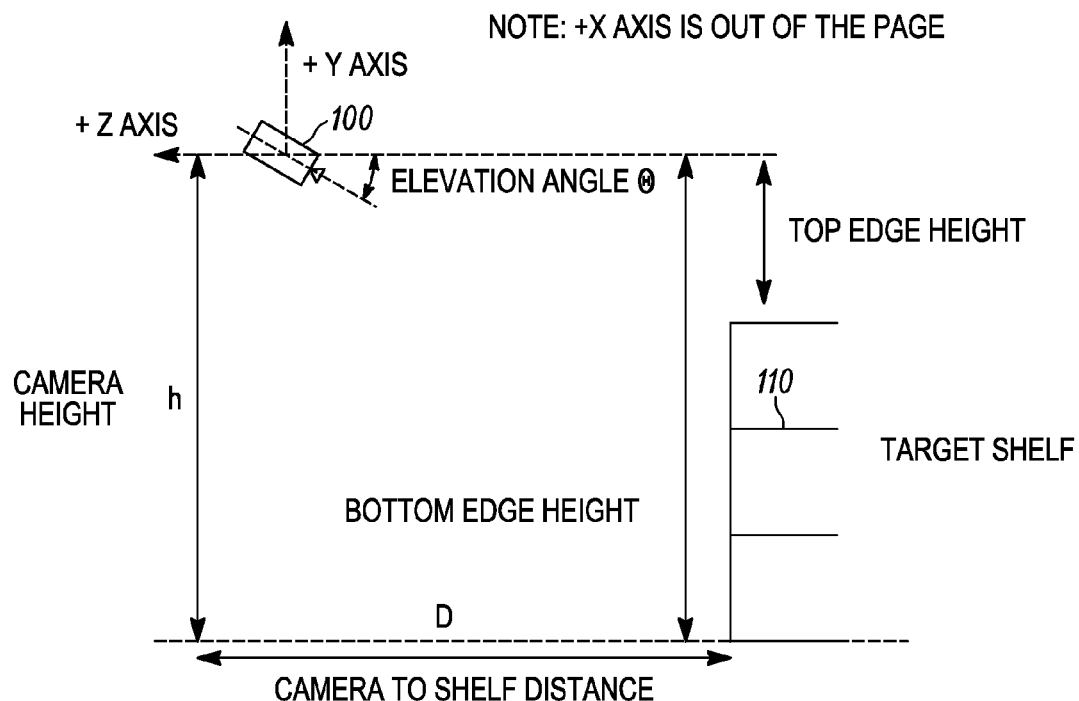
FIG. 1A and FIG. 1B depict the setup for providing shelf level business intelligence (VPA) in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An apparatus for positioning a camera at the vicinity of a shelf comprises a user interface including a display screen displaying input fields for accepting user-input a list of input parameters that includes a height of the camera, a distance from the camera to the shelf, and at least one of a width-span and a height-span that specify a shelf space on the shelf. The apparatus also includes a memory configured to store a required minimum pixel-resolution of a selected label and to store a list of camera types, and a microprocessor configured to determine output parameters from the list of input parameters. The output parameters include an elevation angle, one of a vertical resolution and a horizontal resolution, and one of a vertical field of view and a horizontal field of view. The user interface further includes the display screen displaying at least one camera type selected from the list of camera types based a selection criterion that depends upon at least some of said output parameters.

Figure 1B:
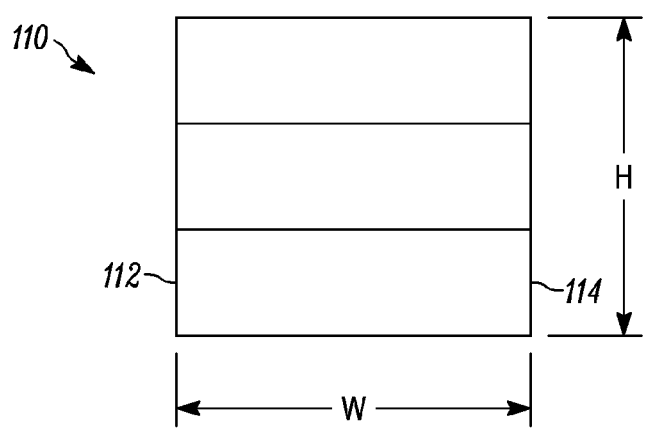

FIG. 1A depicts the setup for providing shelf level business intelligence (VPA) in accordance with some embodiments. In FIG. 1A, the camera 100 is placed above the top edge of the target shelf module 110. The camera will be tilted downwards by an elevation angle $\theta$ (i.e. rotated around the x-axis). In most implementations, the camera 100 will only tilt and there will be no roll or pan. The front edge of the target shelf module 110 is vertical (i.e. constant z). The target shelf module 110, as shown in FIG. 1B, has a width-span W and a height-span H. The camera 100 in FIG. 1A is centered between the left side 112 and the right side 114 of the target shelf module 110 as shown in FIG. 1B.

Figure 2A:
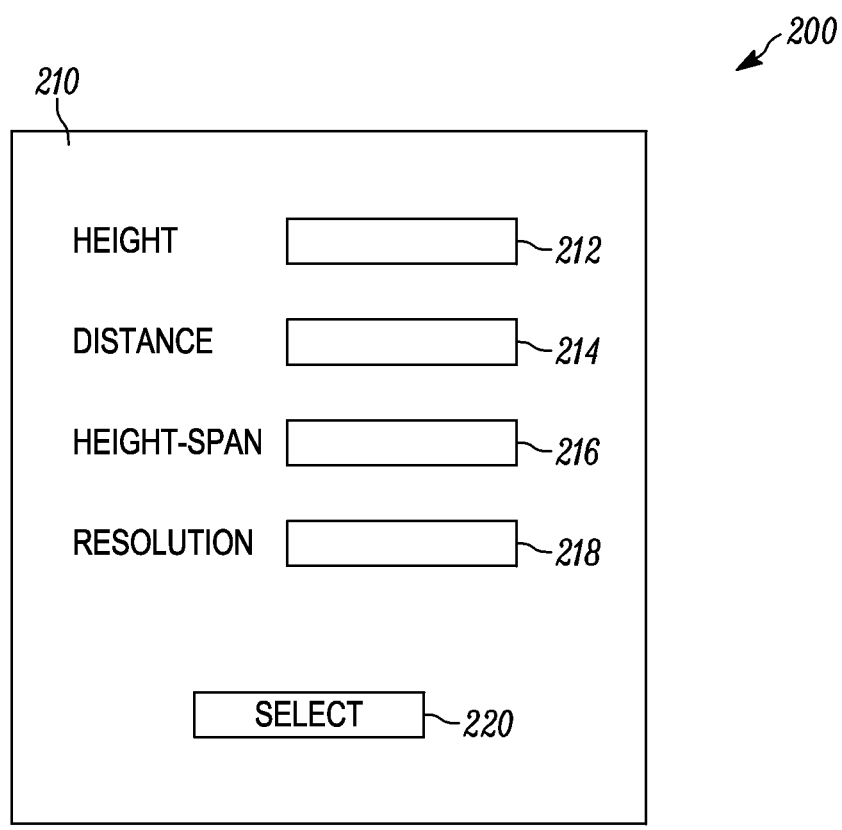
FIG. 2A and FIG. 2B depict a camera calculator that has a display screen configured to accept input parameters and to display the elevation angle and certain camera type that is selected in accordance with some embodiments.
Figure 2B:
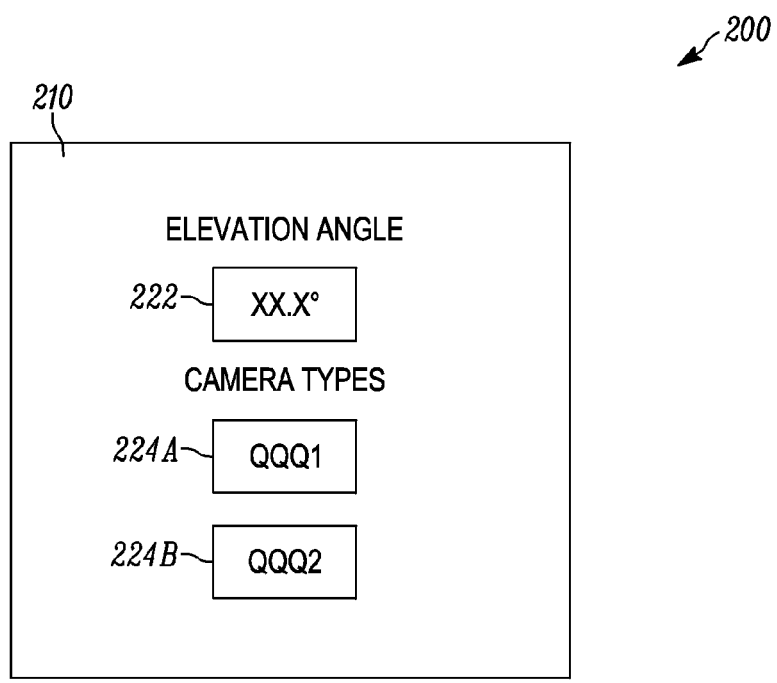

FIG. 2A and FIG. 2B depict a camera calculator 200 that has a display screen 210 configured to accept input parameters and to display certain camera type that is selected in accordance with some embodiments. In FIG. 2A, the display screen 210 is configured for displaying input fields for accepting user-input a list of input parameters. For example, the input fields displayed can include the input field 212 for accepting a height h (as shown in FIG. 1A) of the camera 100, the input field 214 for accepting a distance D (as shown in FIG. 1A) from the camera 100 to the shelf 110, and the input field 216 for accepting a height-span H (as shown in FIG. 1B) that specify a shelf space on the shelf 110.

Figure 3A:
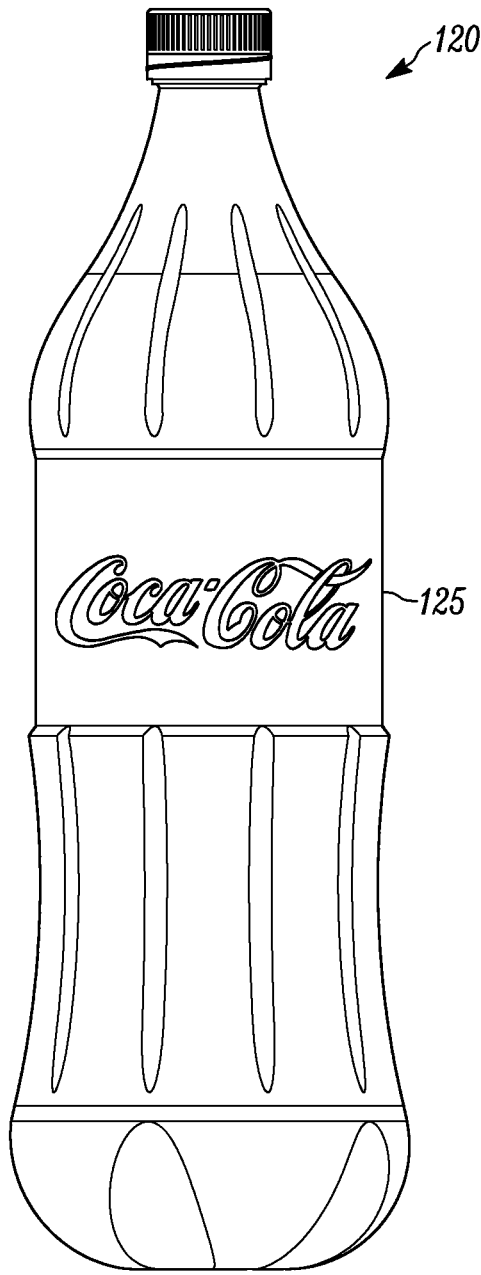
FIG. 3A shows an object having a selected label that needs to be automatically recognized by an analytics algorithm when the object is placed on the shelf in FIG. 1A in accordance with some embodiments.

In some implementations, as shown in FIG. 2A, the input fields displayed on the display screen 210 can further include the input field 218 for accepting the required minimum pixel-resolution of a selected label. In one example, when an object 120 as shown in FIG. 3A is placed on the shelf 110 in FIG. 1A, the required minimum pixel-resolution of a selected label is the required minimum pixel-resolution of the smallest label 125 that needs to be automatically recognized by an analytics algorithm.

After the input fields displayed on the display screen 210 are populated with the list of input parameters, a microprocessor in the camera calculator 200 can determine output parameters from the list of input parameters. Examples of the output parameters include the elevation angle $\theta$ as shown in FIG. 1A, the vertical field of view, the horizontal field of view, the vertical resolution, or the horizontal resolution of the camera 100. Based a selection criterion that depends upon at least some of the output parameters, the camera calculator 200 can further determine one or more camera type selected from a list of camera types stored in the memory of the camera calculator 200.

In one implementation, as shown in FIG. 2A, with the input fields populated with the list of input parameters, after a submit button 220 labeled "SELECT" is actuated, the camera calculator 200 can determine the output parameters and the camera types, and further display the output parameters and the camera types being selected. For example, as shown in FIG. 2B, the display screen 210 on the camera calculator 200 can display the elevation angle θ in the output filed 222, and display the camera types being selected in the output fields 224A and 224B. In some implementations, the display screen 210 can display the display mode as either a portrait mode or a landscape mode.

In some implementations, the memory in the camera calculator 200 also stores a list of lens-components, and the display screen 210 can be configured to display at least one lens-component selected from the list of lens-components based a lens selection criterion that depends upon at least some of the output parameters.

In the implementation as shown in FIG. 2A, the input field 216 is implemented for accepting the height-span H (as shown in FIG. 1B). In other implementations, the input field 216 can be implemented for accepting the width-span W (as shown in FIG. 1B). In still other implementations, input fields can be implemented for accepting both the height-span H and the width-span W (as shown in FIG. 1B). In some implementations, the input field 216 for accepting the height-span H can be replaced with two input fields, one input field for accepting the top edge height of the shelf space (as shown in FIG. 1A) and another input field for accepting the bottom edge height of the shelf space (as shown in FIG. 1A).

Figure 3B:
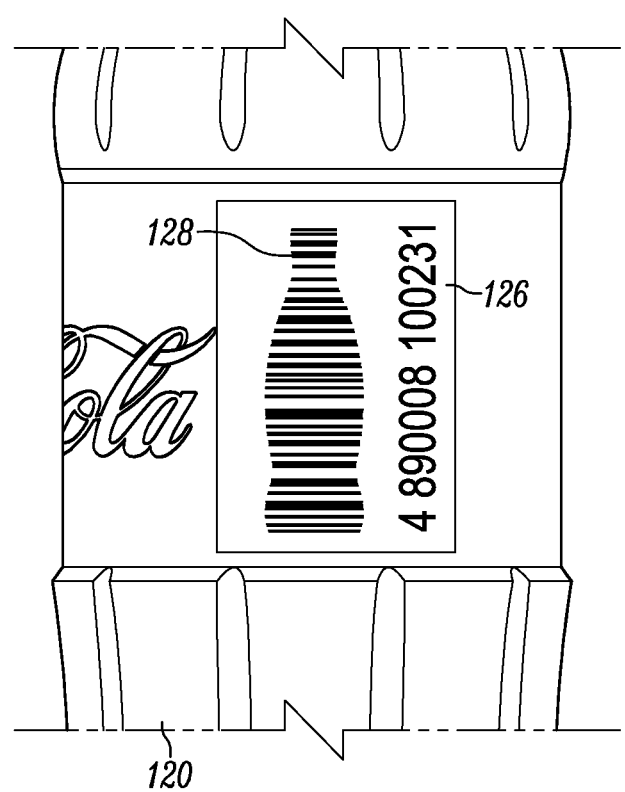
FIG. 3B shows the object on the shelf can have a SKU number and a barcode in accordance with some embodiments.

In FIG. 1A, many of the objects placed on the shelf can have a corresponding stock keeping unit (SKU) number. In an example as shown in FIG. 3B, the object 120 on the shelf can have a SKU number 126. In one implementation, the input fields displayed on the display screen 210 in FIG. 2A can be modified such that the input field 218 for accepting the required minimum pixel-resolution of the selected label can be substituted with an input field for accepting the SKU number. The microprocessor in the camera calculator 200 can be configured to map the SKU number to the required minimum pixel-resolution of the selected label. In still other implementations, the camera calculator 200 can have an imaging capture device configured to capture an image of a barcode 128 (as shown in FIG. 3B) to determine the required minimum pixel-resolution of the selected label 125 as shown in FIG. 3A. For example, decoding a captured image of the barcode 128 can determine the SKU number of the object 120 on the shelf, and such SKU number can be mapped to the required minimum pixel-resolution of the selected label 125.

Figure 4:
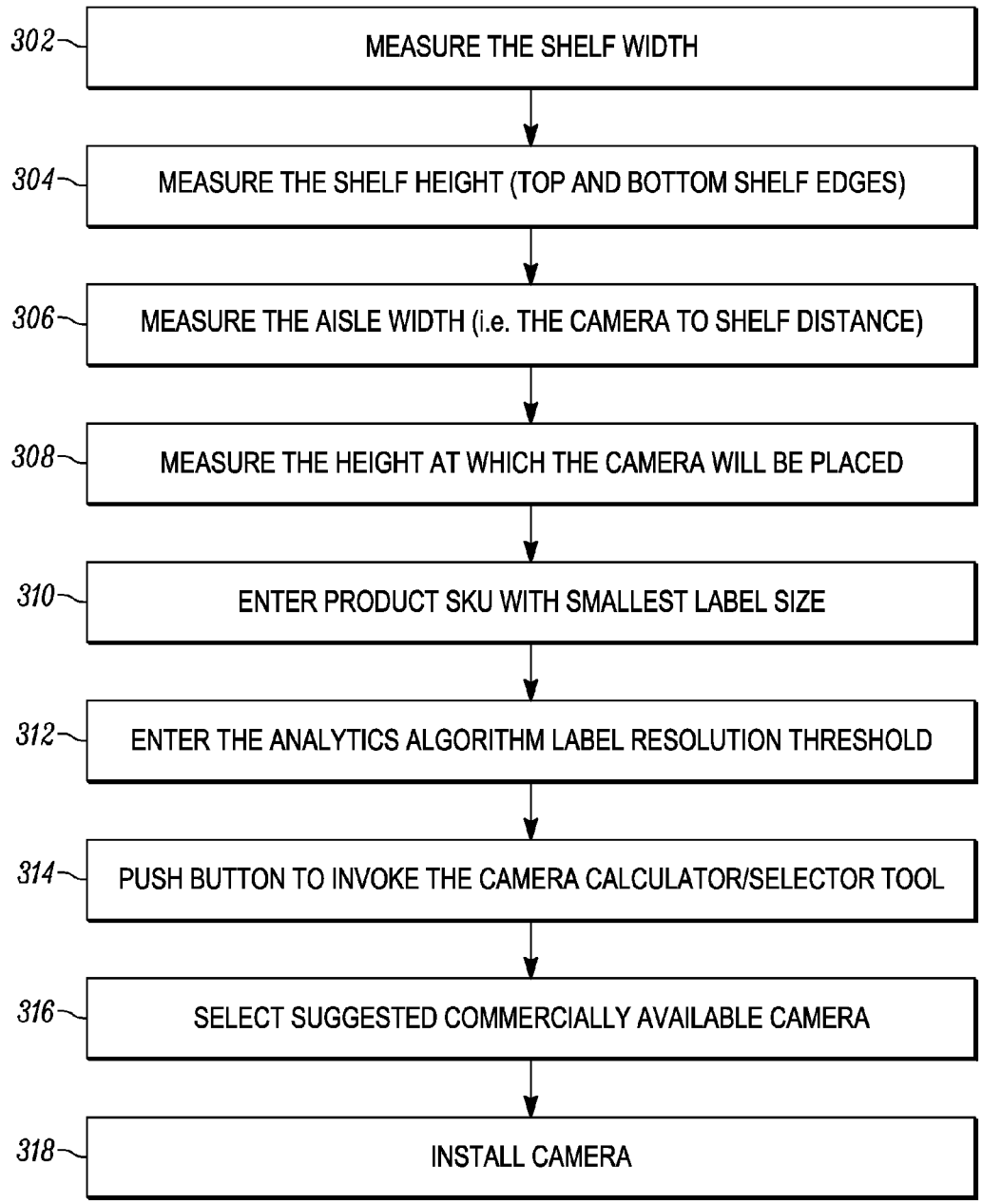
FIG. 4 is a method for using the camera calculator to select a desired camera in accordance with some embodiments.

FIG. 4 is a method 300 for using the camera calculator 200 to select a desired camera in accordance with some embodiments. In FIG. 4, the shelf width is measured at block 302 and the shelf height is measured at block 304. The measurement of the shelf height can include the measurement of the top edge height of the shelf space and bottom edge height of the shelf space as shown in FIG. 1A. At block 306, the aisle width is measured, and such aisle width can be used as an estimation of the camera to shelf distance. At block 308, the height of the camera is measured. After these measurements, the measured parameters can be entered into the camera calculator 200. Additionally, the product SKU with smallest label size and the label resolution threshold for the analytics algorithm are entered into the camera calculator 200 respectively at block 310 and block 312. After pushing the button to invoke the camera calculator and selector tool at block 314, one or more commercially available cameras can be displaced for user's selection at block 316. Finally, the camera can be installed at block 318.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a user interface including a display screen to display input fields to receive values of input parameters, the input parameters including a height of a camera position, a distance from the camera position to a shelf, and a span associated with the shelf;
   memory configured to store a mapping of items to respective ones of a plurality of required minimum pixel-resolutions, wherein the required minimum pixel-resolutions correspond to an image resolution required to identify a corresponding one of the items using an image; and
   a microprocessor configured to:
      obtain identifying information corresponding to one of the items;
      select, using the mapping and based on the identifying information, one of the plurality of required minimum pixel-resolutions; and
      determine a value of an output parameter based on the selected one of the plurality of required minimum pixel resolutions and at least one of the values of the input parameters, wherein the output parameter is one of an elevation angle of the camera, a vertical resolution, a horizontal resolution, a vertical field of view, and a horizontal field of view,
   wherein the display screen is to display the value of the output parameter.

2. The apparatus of claim 1, wherein the input parameters include the required minimum pixel-resolution.

3. The apparatus of claim 1, wherein the one of the items includes a smallest label to be automatically recognized by an analytics algorithm.

4. The apparatus of claim 1, wherein the input parameters include a stock keeping unit number.

5. The apparatus of claim 1, wherein the identifying information is a stock keeping unit number.

6. The apparatus of claim 1 further comprising an imaging capture device, wherein obtaining the identifying information comprises the imaging capture device being configured to capture an image of a barcode.

7. The apparatus of claim 1, wherein the display screen is configured to display one of modes selected from a portrait mode and a landscape mode.

8. The apparatus of claim 1, wherein the memory is configured to store a list of lens-components, and the display screen is configured to display at least one lens-component selected from the list of lens-components based on a lens selection criterion that depends upon the output parameter.

9. The apparatus of claim 1, wherein the span is a width-span of space on the shelf, the input parameters including a second span, the second span being a height-span of space on the shelf.

10. The apparatus of claim 1, wherein the output parameters include the vertical resolution and the horizontal resolution.

11. The apparatus of claim 1, wherein the output parameters include the vertical field of view and the horizontal field of view.

12. An apparatus comprising:
   a user interface including a display screen to display input fields to accept values of input parameters, the input parameters including a height of a camera position, a distance from the camera position to the shelf, and a span associated with the shelf;
   memory configured to store a mapping of items to respective ones of a plurality of required minimum pixel-resolutions, wherein the plurality of required minimum pixel-resolutions correspond to an image resolution required to identify a corresponding one of the items using an image;
   an image sensor to capture an image of a barcode located on one of the items; and
   a microprocessor configured to:
      select, using the mapping and based on the image of the barcode, one of the plurality of required minimum pixel-resolutions; and
      determine a value of an output parameter based on the selected one of the plurality of required minimum pixel resolutions and at least one of the values of the input parameters, wherein the output parameter is one of an elevation angle of a camera, a vertical resolution, a horizontal resolution, a vertical field of view, and a horizontal field of view, wherein the display screen is to display the value of the output parameter.

13. The apparatus of claim 12, wherein the memory is configured to store a list of camera types, and the display screen is configured to display at least one camera type selected from the list of camera types based a selection criterion that depends upon the value of the output parameter.

14. The apparatus of claim 12, wherein the memory is configured to store a list of camera types and a list of lens-components, and the display screen is configured to display at least one camera type selected from the list of camera types and at least one lens-component selected from the list of lens-components based a selection criterion that depends upon the value of the output parameter.

15. A method comprising:

obtaining, via a user interface of a computing device, values of input parameters, the input parameters including a height of a camera position, a distance from the camera position to a shelf, and a span associated with the shelf;

capturing with an imaging capture device of the computing device an image of a selected label;

storing, in memory of the computing device, a mapping of a plurality of required minimum pixel-resolutions to respective ones of a plurality of labels;

selecting, using the mapping and based on the image of the selected label, one of the plurality of required minimum pixel-resolutions;

determining, based on the selected one of the plurality of required minimum pixel-resolutions, with the computing device a value of an output parameter, wherein the output parameter is one of an elevation angle of a camera, a vertical resolution, a horizontal resolution, a vertical field of view, and a horizontal field of view; and displaying on a display screen of the computing device the value of the output parameter.

16. The method of claim 15, further comprising:

storing a list of lens-components in the memory of the computing device; and displaying on the display screen of the computing device at least one lens-component selected from the list of lens-components based a lens selection criterion that depends upon the value of the output parameter.

17. The apparatus of claim 12, wherein the microprocessor is configured to select the one of the plurality of required minimum pixel-resolutions based on the image of the barcode by obtaining a stock keeping unit from the image of the barcode, the stock keeping unit identifying the one of the items.

* * * * *